United States Patent
Chen et al.

(10) Patent No.: US 10,495,956 B2
(45) Date of Patent: Dec. 3, 2019

(54) PROJECTOR HAVING FLEXIBLE SEALING ELEMENT

(71) Applicant: Coretronic Corporation, Hsin-Chu (TW)

(72) Inventors: Chi-Chen Chen, Hsin-Chu (TW); Chia-Tien Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 87 days.

(21) Appl. No.: 14/742,713

(22) Filed: Jun. 18, 2015

(65) Prior Publication Data

US 2016/0085140 A1   Mar. 24, 2016

(30) Foreign Application Priority Data

Sep. 22, 2014   (CN) .......................... 2014 1 0487428

(51) Int. Cl.
    *G03B 21/16*     (2006.01)
    *G03B 21/14*     (2006.01)
    *H04N 9/31*      (2006.01)

(52) U.S. Cl.
    CPC ........... *G03B 21/145* (2013.01); *G03B 21/16* (2013.01); *H04N 9/3144* (2013.01)

(58) Field of Classification Search
    CPC .... G03B 21/142; G03B 21/145; G03B 21/16; H04N 9/3144
    See application file for complete search history.

(56) References Cited

U.S. PATENT DOCUMENTS

| | | | | |
|---|---|---|---|---|
| 4,458,990 A | * | 7/1984 | Kawai | G02B 7/10 359/700 |
| 6,854,848 B2 | * | 2/2005 | Fujimori | H04N 9/3141 348/750 |
| 7,246,908 B2 | * | 7/2007 | Salvatori | H04N 9/3141 348/E5.143 |
| 7,253,967 B2 | * | 8/2007 | Wang | G02B 7/10 359/694 |
| 7,348,737 B2 | * | 3/2008 | Fujii | H05B 41/2923 315/209 R |

(Continued)

FOREIGN PATENT DOCUMENTS

| | | |
|---|---|---|
| CN | 101583247 | 11/2009 |
| CN | 201965382 | 9/2011 |

(Continued)

OTHER PUBLICATIONS

Epson MovieMate 25 Projector Review, Apr. 17, 2006.*

(Continued)

*Primary Examiner* — Bao-Luan Q Le
(74) *Attorney, Agent, or Firm* — JCIPRNET

(57) ABSTRACT

A projector including an outer casing, a projection lens and a flexible sealing element is provided. The casing has a first opening. The projection lens is disposed in the casing and has a focusing portion, where the focusing portion is aligned to the first opening. The flexible sealing element is connected to a periphery of the first opening to seal the first opening. The focusing portion is connected to the flexible sealing element. When an external force is exerted to the flexible sealing element, the flexible sealing element is deformed and drives the focusing portion to move, so as to focus the projection lens.

12 Claims, 6 Drawing Sheets

(56) References Cited

U.S. PATENT DOCUMENTS

| | | | | |
|---|---|---|---|---|
| 7,354,161 B2* | 4/2008 | Kuroda | ............... | G03B 5/00 348/E5.143 |
| 7,560,653 B1* | 7/2009 | Sage | ............... | H01H 9/04 200/302.1 |
| 7,658,499 B2* | 2/2010 | Meng | ............... | G03B 3/02 353/100 |
| 7,872,643 B2* | 1/2011 | Galligan | ............... | G03B 21/16 345/204 |
| 7,872,816 B2* | 1/2011 | Chen | ............... | G02B 7/10 359/703 |
| 7,980,700 B2* | 7/2011 | Hayashi | ............... | G03B 31/00 353/119 |
| 8,118,437 B2* | 2/2012 | Otsuki | ............... | G03B 21/142 349/5 |
| 8,259,094 B2* | 9/2012 | Galligan | ............... | G03B 21/16 345/204 |
| 8,449,124 B2* | 5/2013 | Tseng | ............... | G02B 7/04 353/100 |
| 8,503,105 B2* | 8/2013 | Huang | ............... | G02B 7/10 359/694 |
| 8,752,968 B2* | 6/2014 | Saito | ............... | G03B 21/142 353/100 |
| 9,244,247 B2* | 1/2016 | Tsuchiya | ............... | G02B 7/28 |
| 2003/0071975 A1* | 4/2003 | Fujimori | ............... | H04N 9/3141 353/31 |
| 2003/0128973 A1 | 7/2003 | Shinohara et al. | | |
| 2004/0228130 A1* | 11/2004 | Kato | ............... | F21V 29/02 362/294 |
| 2006/0092384 A1* | 5/2006 | Kuroda | ............... | G03B 5/00 353/69 |
| 2006/0164609 A1* | 7/2006 | Liu | ............... | G03B 9/02 353/97 |
| 2007/0024204 A1* | 2/2007 | Fujii | ............... | H05B 41/2923 315/209 R |
| 2007/0046906 A1* | 3/2007 | Ruan | ............... | G03B 21/142 353/101 |
| 2007/0064205 A1* | 3/2007 | Meng | ............... | G03B 3/02 353/101 |
| 2007/0134981 A1 | 6/2007 | Shinoda et al. | | |
| 2007/0258016 A1* | 11/2007 | Galligan | ............... | G03B 21/16 348/744 |
| 2009/0086172 A1* | 4/2009 | Otsuki | ............... | G03B 21/142 353/119 |
| 2009/0168024 A1* | 7/2009 | Hayashi | ............... | G03B 31/00 353/15 |
| 2009/0201470 A1* | 8/2009 | Kurita | ............... | H04N 9/3141 353/119 |
| 2009/0225284 A1* | 9/2009 | Huang | ............... | G03B 3/00 353/101 |
| 2009/0244722 A1* | 10/2009 | Chen | ............... | G02B 7/10 359/694 |
| 2011/0102387 A1* | 5/2011 | Galligan | ............... | G03B 21/16 345/204 |
| 2011/0181843 A1* | 7/2011 | Hashiba | ............... | G03B 21/16 353/52 |
| 2011/0181844 A1* | 7/2011 | Hashiba | ............... | G03B 21/16 353/52 |
| 2011/0181847 A1* | 7/2011 | Yamamoto | ............... | G03B 21/145 353/119 |
| 2011/0199590 A1* | 8/2011 | Yamamoto | ............... | G03B 21/54 353/119 |
| 2012/0194919 A1* | 8/2012 | Huang | ............... | G02B 7/10 359/701 |
| 2012/0242966 A1* | 9/2012 | Saito | ............... | G03B 21/145 353/100 |
| 2012/0314354 A1* | 12/2012 | Rayner | ............... | G06F 1/1656 361/679.01 |
| 2013/0114054 A1* | 5/2013 | Ishikawa | ............... | G03B 21/145 353/119 |
| 2014/0132938 A1* | 5/2014 | Tsuchiya | ............... | G02B 7/28 353/101 |
| 2015/0185594 A1* | 7/2015 | Chen | ............... | G03B 21/145 353/52 |

FOREIGN PATENT DOCUMENTS

| | | |
|---|---|---|
| CN | 102269922 | 12/2011 |
| CN | 102437463 | 5/2012 |
| CN | 103186023 | 7/2013 |
| CN | 103219606 | 7/2013 |
| CN | 103223621 | 7/2013 |
| CN | 103424964 | 12/2013 |
| CN | 103917069 | 7/2014 |

OTHER PUBLICATIONS

"First Office Action of China Counterpart Application", dated Jan. 9, 2017, p. 1-p. 6, in which the listed references were cited.

* cited by examiner

PROJECTOR HAVING FLEXIBLE SEALING ELEMENT

CROSS-REFERENCE TO RELATED APPLICATION

This application claims the priority benefit of China application serial no. 201410487428.3, filed on Sep. 22, 2014. The entirety of the above-mentioned patent application is hereby incorporated by reference herein and made a part of this specification.

BACKGROUND

Technical Field

The invention relates to a waterproof structure, and particularly relates to a water proof structure of a projector.

Related Art

A projector is a display device capable of producing large size images. A projector is to convert an illumination beam produced by a light source module into an image beam by using a light valve, and the image beam is projected onto a screen or a wall by a projection lens to form an image.

Generally, a projector when operating would suffer high temperature in internal thereof due to operation of components therein, such as the light source, power supply, etc. Therefore, an air inlet and an air outlet are required on the outer casing of the projector for heat dissipation through air convection. Moreover, a focusing structure (e.g. focus ring; focus lever) is configured to the projection lens of the projector for user's operation, and a gap is required between the focusing structure and the outer casing to avoid structure interference when the focusing structure is operated. Moreover, sound holes are required on the outer casing of the projector for a speaker inside the projector to output sound. Additionally, the outer casing of the projector is required to have a signal input/output socket for insertion of an external connector. External water probably enters inside of the projector through the aforementioned air inlet, air outlet, the gap between the focusing structure and the outer casing, the sound holes and the signal input/output socket, such that waterproof capability of the projector is inadequate.

China patent publication No. CN103917069 discloses a camera casing sealing structure, in which a rubber gasket is used to seal a gap between a top cover casing and a back cover casing. China patent publication No. CN103223621 discloses a waterproof device, in which a protection cover has a sealing cavity used for containing a camera, and a glass sheet is used to prevent liquid from spraying on the camera. China patent publication No. CN103424964 discloses a projection apparatus, in which a waterproof tank is used to contain a light source, a lens and a heat dissipation assembly thereof. U.S. patent publication No. US20070134981 discloses a waterproof casing of an electronic assembly, in which a cover thereof has air holes and a waterproof filter covering the air holes. China patent publication No. CN103219606 discloses a waterproof socket, in which a waterproof box with a flip type cover is embedded with a sealing ring to achieve a waterproof effect. China patent publication No. CN102437463 discloses a socket casing, which has a gasket made of a waterproof material and has an elastic gasket socket, and when a pin is inserted into the elastic gasket socket, a sealing effect is achieved through elasticity of the elastic gasket socket. China utility model publication No. CN201965382 discloses a waterproof focusing structure of a lens, and the waterproof focusing structure has small pores to improve the waterproof effect.

The information disclosed in this "BACKGROUND" section is only for enhancement understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention was acknowledged by a person of ordinary skill in the art.

SUMMARY

The invention is directed to a projector, which has good waterproof effect.

Other objects and advantages of the invention can be further illustrated by the technical features broadly embodied and described as follows.

In order to achieve one or a portion of or all of the objects or other objects, an embodiment of the invention provides a projector including an outer casing, a projection lens and a flexible sealing element. The outer casing has a first opening. The projection lens is disposed in the outer casing and has a focusing portion, where the focusing portion is aligned to the first opening. The flexible sealing element is connected to a periphery of the first opening to seal the first opening. The focusing portion is connected to the flexible sealing element. When an external force is exerted to the flexible sealing element, the flexible sealing element is deformed and drives the focusing portion to move, so as to focus the projection lens.

In an embodiment of the invention, the flexible sealing element includes a sealing portion, a connection portion and a deformation portion. The sealing portion is connected to the periphery of the first opening, the connection portion is connected to the focusing portion, and the deformation portion is connected between the sealing portion and the connection portion, and when the external force is exerted to the connection portion, the connection portion drives the focusing portion to move and the deformation portion is deformed.

In an embodiment of the invention, the focusing portion is a pillar, and the connection portion wraps the pillar.

In an embodiment of the invention, the projector includes a fixing element, where the sealing portion is clamped between the periphery of the first opening and the fixing element.

In an embodiment of the invention, the projector includes a first ring-shape sealing element, where the outer casing includes an upper shell and a lower shell, and the ring-shape sealing element seals a gap between the upper shell and the lower shell.

In an embodiment of the invention, the ring-shape sealing element seals a gap between a periphery of the upper shell and a periphery of the lower shell.

In an embodiment of the invention, the projector includes a locking element, where the upper shell has a first projection, the lower shell has a second projection, the first projection has a first locking hole, the second projection has a second locking hole, the locking element locks the first projection to the second projection through the first locking hole and the second locking hole, and a second ring-shape sealing element surrounds the locking element and seals a gap between the first projection and the second projection.

In an embodiment of the invention, the projector includes a cover, where a sidewall of the outer casing has at least one signal input/output socket, and the cover is detachably disposed on the sidewall to cover the signal input/output socket.

In an embodiment of the invention, the sidewall has a positioning hole, the cover has a positioning column, and the positioning column is inserted into the positioning hole to position the cover to the sidewall.

In an embodiment of the invention, the projector includes a third ring-shape sealing element, where the third ring-shape sealing element seals a gap between a periphery of the cover and the outer casing.

In an embodiment of the invention, the projector includes a cover, where the cover has at least one opening and at least one ring-shape sealing flange, a sidewall of the outer casing has at least one signal input/output socket, the cover is fixed to the sidewall, the opening is aligned to the signal input/output socket, and when an external connector sequentially penetrates through the opening and the signal input/output socket for connecting with the projector, the ring-shape sealing flange surrounds the external connector and seals a gap between the external connector and the cover.

In an embodiment of the invention, the cover has a drain hole, and when the external connector sequentially penetrates through the opening and the signal input/output socket for connecting with the projector, a cavity is formed between the external connector and the cover, and the drain hole is connected to the cavity.

In an embodiment of the invention, the projector includes a transparent plate, where the outer casing has a second opening, the second opening is aligned to the projection lens, and an optical axis of the projection lens passes through the second opening, and the transparent plate is adhered to a periphery of the second opening to seal the second opening.

In an embodiment of the invention, the projector includes a waterproof film, where the outer casing has at least one sound hole, and the waterproof film covers the sound hole.

In an embodiment of the invention, the projector includes a heat dissipation block, where the heat dissipation block is disposed in the outer casing, and is used for conducting heat within the outer casing to the outer casing.

In an embodiment of the invention, the projector includes an electric energy storage unit, where the electric energy storage unit is disposed in the outer casing, and is used for providing electric power required for the operation of the projector.

According to the above descriptions, the embodiments of the invention have at least one of the following advantages. In the embodiments of the invention, the outer casing of the projector exposes the focusing portion of the projecting lens through the first opening, and the first opening is sealed by the flexible sealing element, so as to prevent external liquid (e.g. water) from entering the internal of the projector through the gap between the focusing portion and the periphery of the first opening. When the user operates the focusing portion, the flexible sealing element is deformed, such that the focusing portion is capable of being smoothly operated. In this way, based on configuration of the flexible sealing element, the projector has a good waterproof capability while the normal operation of the focusing portion is not influenced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

Figure 1:
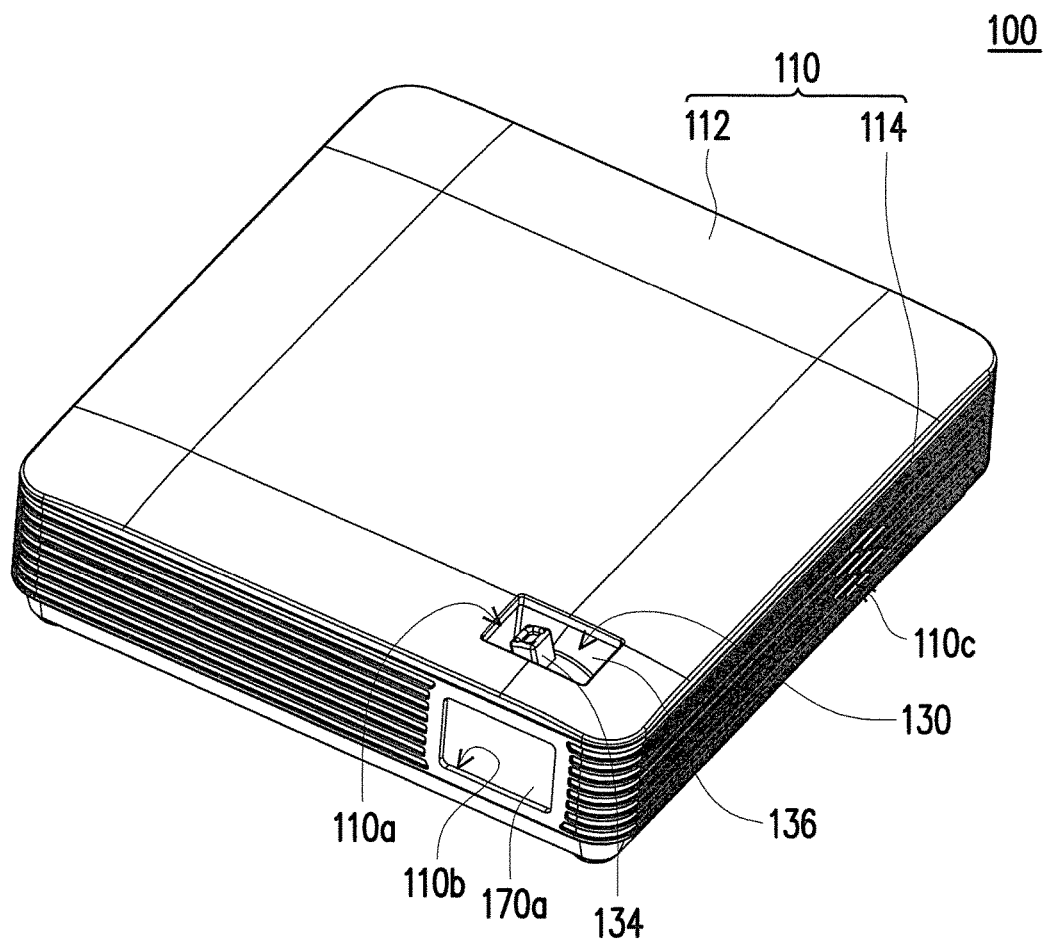
FIG. 1 is a three-dimensional view of a projector according to an embodiment of the invention.
Figure 2:
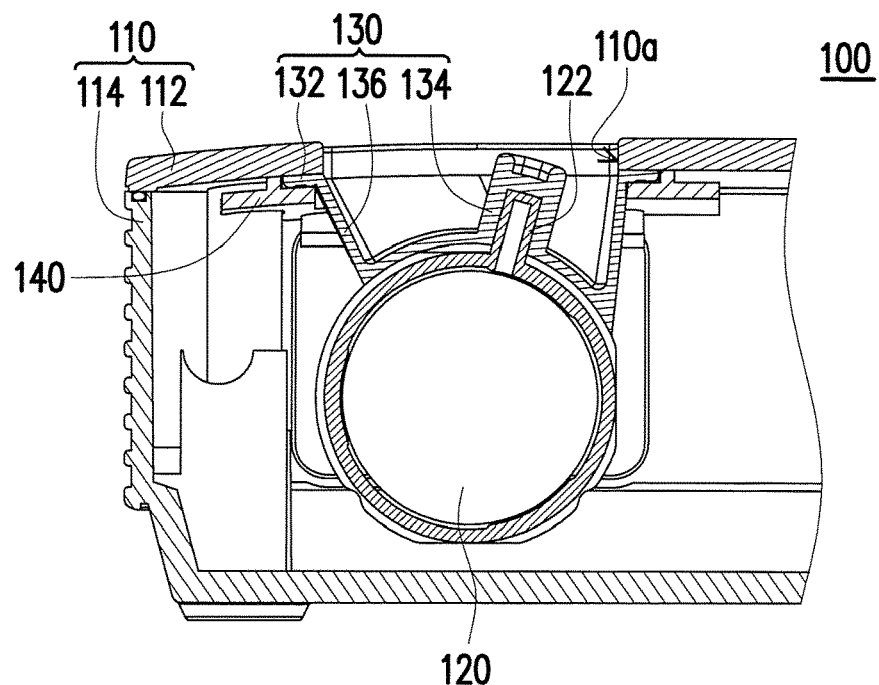
FIG. 2 is a partial cross-sectional view of the projector of FIG. 1.
Figure 3:
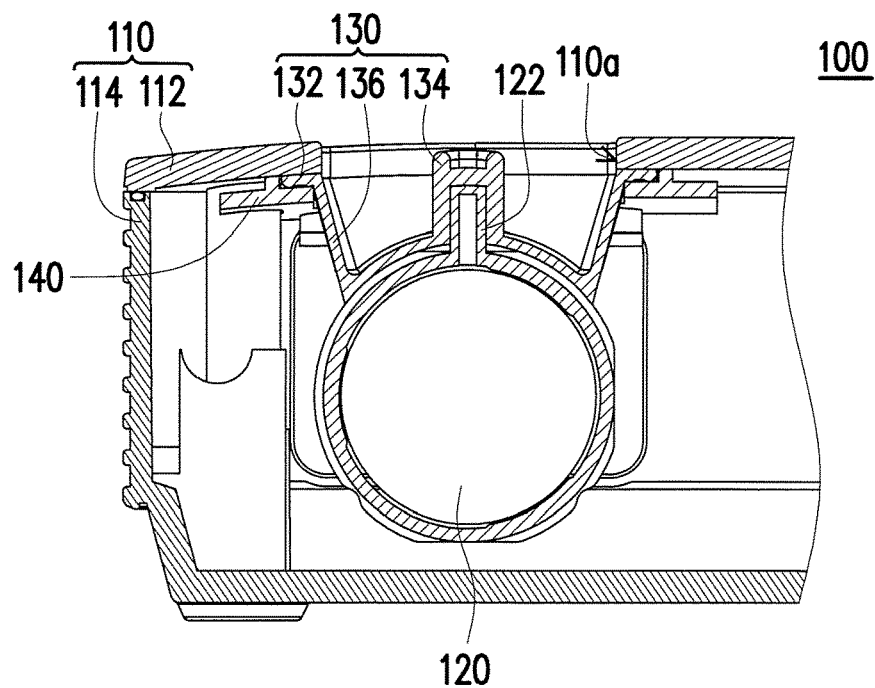
FIG. 3 illustrates a situation that a focusing portion of FIG. 2 is operated.

FIG. 1 is a three-dimensional view of a projector according to an embodiment of the invention. FIG. 2 is a partial cross-sectional view of the projector of FIG. 1. FIG. 3 illustrates a situation that a focusing portion of FIG. 2 is operated. Referring to FIG. 1 to FIG. 3, the projector 100 of the present embodiment includes an outer casing 110, a projection lens 120 and a flexible sealing element 130. The outer casing 110 has a first opening 110a. The projection lens 120 is disposed in the casing 110 and has a focusing portion 122, where the focusing portion 122 is aligned to the first opening 110a. The focusing portion 122 comprises, for example, a pillar or a lever used to operate the focus ring of the projection lens 120.

The flexible sealing element 130 is, for example, a flexible sheet connected to the focusing portion 122 and is used to cover and seal the first opening 110a. A material of the flexible sealing element 130 is, for example, rubber or other suitable flexible waterproof material. The flexible sealing element 130 is connected to a periphery of the first opening 110a to seal the first opening 110a (i.e. water would not enter inside of the projector 100 through the first opening 110a), and the focusing portion 122 is connected to the flexible sealing element 130. In one embodiment, the flexible sealing element 130 is adapted to fit the periphery of the focusing portion 122, as shown in FIGS. 1 to 3. When a user exerts an external force to the flexible sealing element 130, the flexible sealing element 130 is deformed and drives the focusing portion 122 of the projection lens 120 to move, so as to focus the projection lens 120, as shown in FIG. 2 or FIG. 3.

As described above, the outer casing 110 of the projector 100 exposes the focusing portion 122 of the projection lens 120 through the first opening 110a, and the first opening 110a is sealed by the flexible sealing element 130 to prevent external liquid (e.g. water) from entering inside of the projector 100 through a gap between the focusing portion 122 and the periphery of the first opening 110a. When the user operates the focusing portion 122, the flexible sealing element 130 is deformed, such that the focusing portion 122 could be smoothly operated. In this way, based on configuration of the flexible sealing element 130, the projector 100 may have a good waterproof capability while the normal operation of the focusing portion 120 would not be influenced.

Referring to FIG. 2 and FIG. 3, the flexible sealing element 130 of the present embodiment includes a sealing portion 132, a connection portion 134 and a deformation portion 136. The sealing portion 132 is connected to the periphery of the first opening 110a, the connection portion 134 is connected to the focusing portion 122, and the deformation portion 136 is formed integrally between the sealing portion 132 and the connection portion 134 and is fitted to the focus ring. When the user exerts the external force to the connection portion 134 of the flexible sealing element 130, the connection portion 134 drives the focusing portion 122 to move and the deformation portion 136 is deformed.

In detail, the projector 100 of the present embodiment includes a fixing element 140. The fixing element 140 is fixed to the outer casing 110, and the sealing portion 132 of the flexible sealing element 130 is clamped between the periphery of the first opening 110a and the fixing element 140, so as to seal the first opening 110a. Moreover, the focusing portion 122 of the present embodiment comprises, for example, a pillar or a lever, and the connection portion 134 of the flexible sealing element 130 wraps the pillar. In other embodiments, the sealing portion 132 could be connected to the periphery of the first opening 110a through other suitable manner, and the connection portion 134 could be connected to the focusing portion 122 through other suitable manner, which is not limited by the invention.

Figure 4:
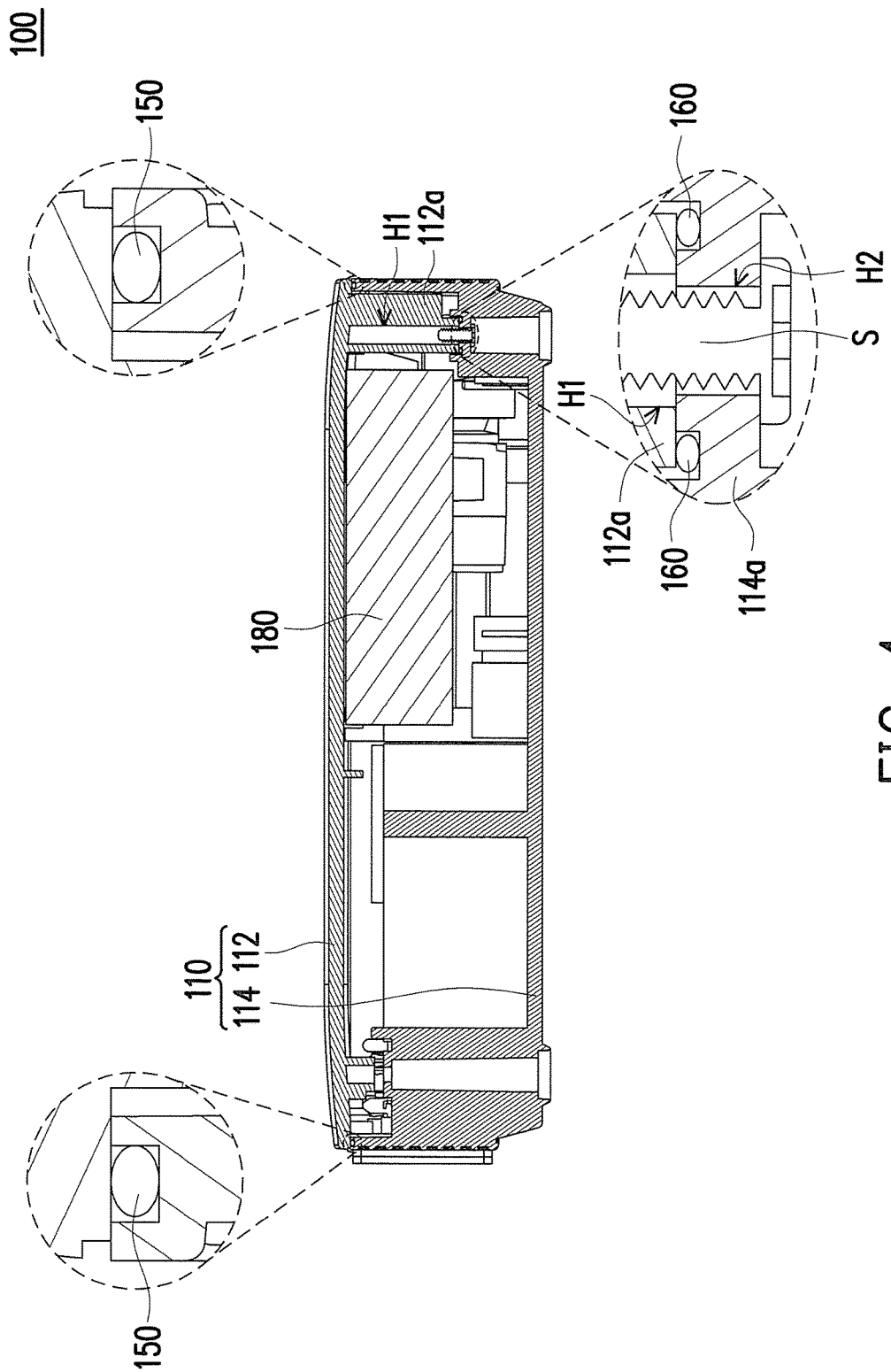
FIG. 4 is a cross-sectional view of the projector of FIG. 1.

FIG. 4 is a cross-sectional view of the projector of FIG. 1. Referring to FIG. 4, in the present embodiment, the projector 100 includes a first ring-shape sealing element 150 and a second ring-shape sealing element 160. A material of the first ring-shape sealing element 150 and the second ring-shape sealing element 160 is, for example, rubber, though the invention is not limited thereto. In one embodiment, the first ring-shape sealing element 150 and the second ring-shape sealing element 160 are the ring-shape rubber band. The outer casing 110 includes an upper shell 112 and a lower shell 114 matched to each other, and the first ring-shape sealing element 150 and the second ring-shape sealing element 160 seal a gap between the upper shell 112 and the lower shell 114, so as to prevent the external liquid (e.g. water) from entering inside of the projector through the gap between the upper shell 112 and the lower shell 114.

In detail, the first ring-shape sealing element 150 extends along the periphery of the outer casing 110 to seal a gap between a periphery of the upper shell 112 and a periphery of the lower shell 114, so as to prevent the external liquid (e.g. water) from entering inside of the projector 100 from the periphery of the outer casing 110. Moreover, the projector 100 includes a locking element S such as a screw, the upper shell 112 has a first projection 112a, the lower shell 114 has a second projection 114a, the first projection 112a has a first locking hole H1, the second projection 114a has a second locking hole H2, and the locking element S locks the first projection 112a to the second projection 114a through the first locking hole H1 and the second locking hole H2, so as to fix the upper shell 112 and the lower shell 114. The second ring-shape sealing element 160 surrounds the locking element S and seals a gap between the first projection 112a and the second projection 114a, so as to prevent the external liquid from entering inside of the projector 100 through the locking hole H2 and the gap between the first projection 112a and the second projection 114a.

Figure 5:
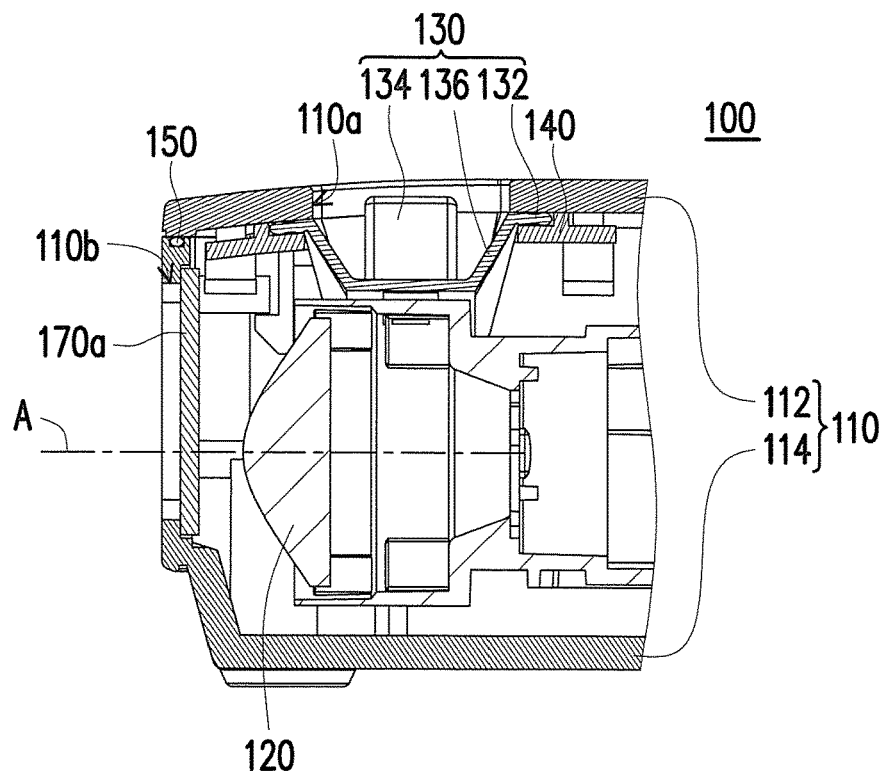
FIG. 5 is a partial cross-sectional view of the projector of FIG. 1.

FIG. 5 is a partial cross-sectional view of the projector of FIG. 1. Referring to FIG. 1 and FIG. 5, the projector 100 of the present embodiment includes a transparent plate 170a. The outer casing 110 has a second opening 110b, and the second opening 110b is aligned to the projection lens 120, an optical axis A of the projection lens 120 passes through the second opening 110b, and the transparent plate 170a is adhered to a periphery of the second opening 110b to seal the second opening 110b, so as to prevent the external liquid from entering the internal of the projector 100 through the second opening 110b. The transparent plate 170a, for example, is a glass plate, a glass lens or a plastic plate.

Figure 6:
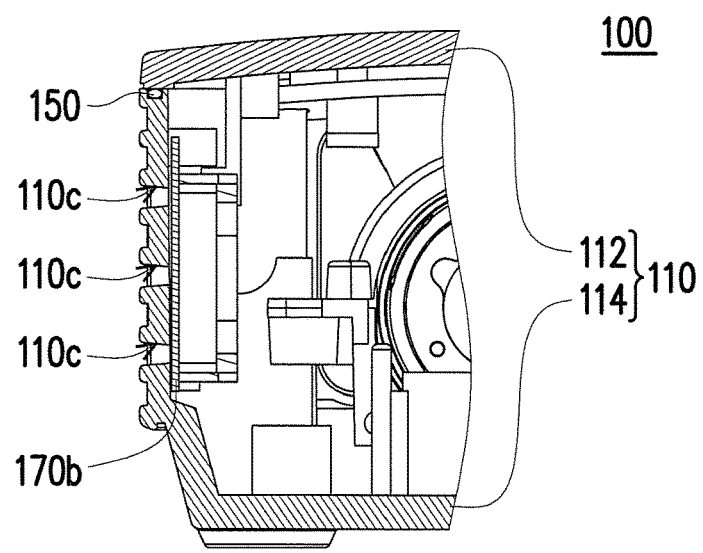
FIG. 6 is a partial cross-sectional view of the projector of FIG. 1.

FIG. 6 is a partial cross-sectional view of the projector of FIG. 1. Referring to FIG. 6, the projector 100 of the present embodiment includes a waterproof film 170b. The outer casing 110 has at least one sound hole 110c (a plurality of sound holes are illustrated) for a speaker inside the projector 100 to output sounds. The waterproof film 170b covers the sound holes 110c to prevent the external liquid (e.g. water) from entering inside of the projector 100 through the sound holes 110c.

Referring to FIG. 4, the projector of the present embodiment includes a heat dissipation block 180. The heat dissipation block 180 is disposed in the outer casing 110, and is used for conducting heat within the outer casing 110 to the outer casing 110 for heat dissipation. In this way, it is unnecessary to configure an air inlet and an air outer outlet on the casing 110 of the projector 100, and the heat dissipation block 180 is used to conduct the heat in internal of the projector 100 to external through a conduction manner, so as to avoid the external liquid (e.g. water) from entering inside of the projector 100 through the air inlet and the air outlet. Furthermore, in one embodiment, because an air inlet and an air outer outlet are not required, air flow generators, such as fans, are not required.

Figure 7:
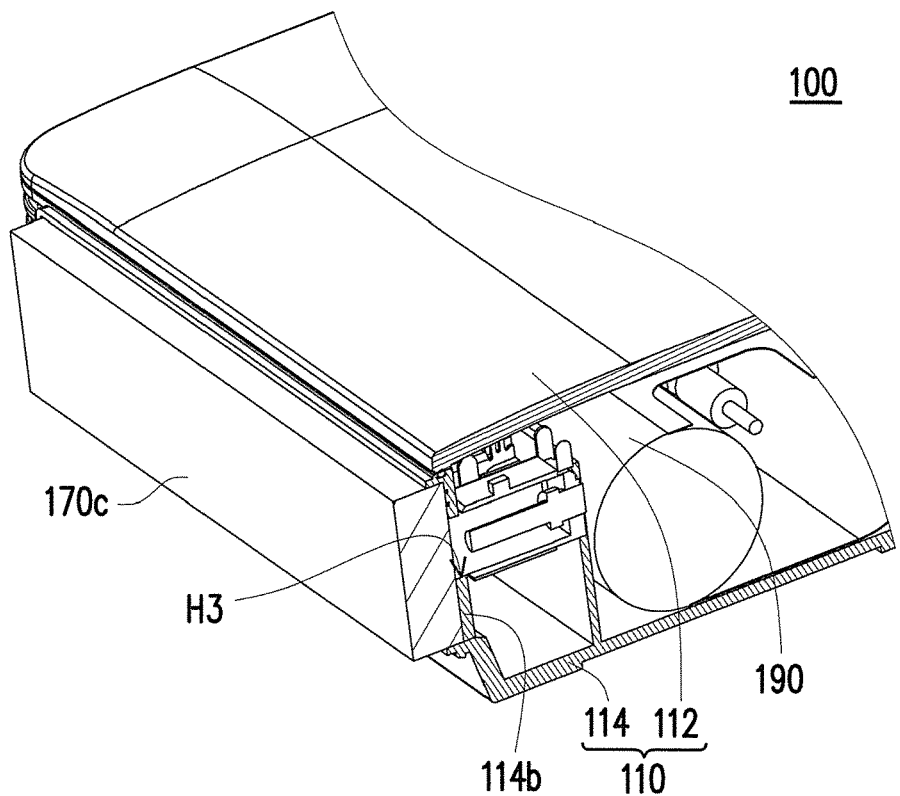
FIG. 7 is a partial structural three-dimensional view of the projector of FIG. 1.

FIG. 7 is a partial structural three-dimensional view of the projector of FIG. 1. Referring to FIG. 7, the projector 100 of the present embodiment includes a cover 170c, and a sidewall 114b of the lower shell 114 of the outer casing 110 has at least one signal input/output socket H3 to receive a signal connector (not shown). The cover 170c is detachably disposed on the sidewall 114b to cover the signal input/output socket H3 for waterproofing. When the cover 170c covers the signal input/output socket H3, it would avoid the external liquid (e.g. water) from entering inside of the projector 100 through the signal input/output socket H3. In one embodiment, the sidewall 114b of the lower shell 114 may have a power socket (not shown) to receive a power cable (not shown) for receiving the external power, and the cover 170c could covers the power socket to avoid the external liquid (e.g. water) from entering inside of the projector 100 through the power socket. Moreover, in another embodiment, the projector 100 may include an electric energy storage unit 190. The electric energy storage unit 190 is, for example, a rechargeable battery and is disposed in the outer casing 110 for providing electric power required for the operation of the projector 100. In this way, the projector may not need a power socket to receive the power cable for receiving the external power so as to reduce the possibility of external liquid (e.g. water) entering inside of the projector.

Figure 8:
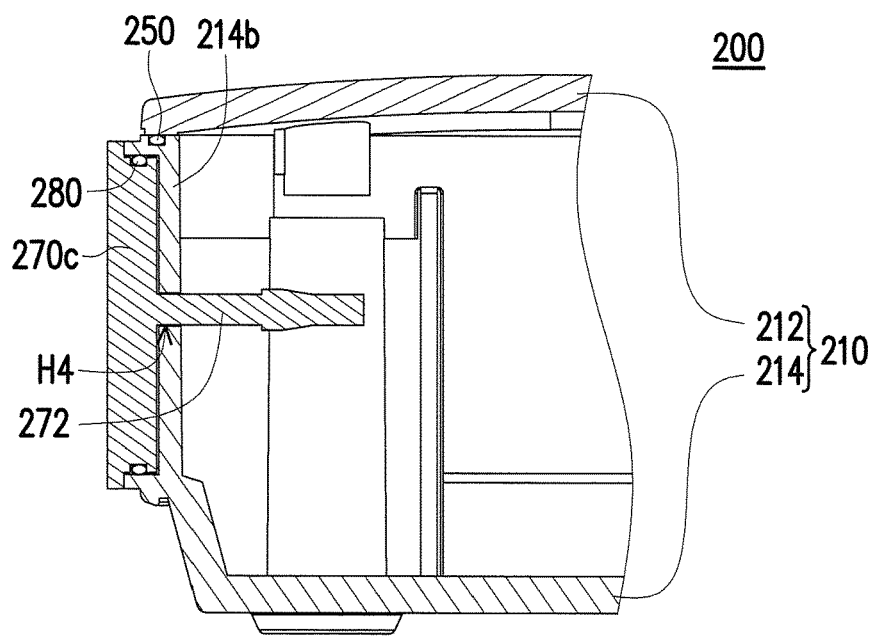
FIG. 8 is a partial cross-sectional view of a projector according to another embodiment of the invention.

FIG. 8 is a partial cross-sectional view of a projector according to another embodiment of the invention. In the projector 200 of FIG. 8, configuration and functions of a casing 210, an upper shell 212, a lower shell 214, a sidewall 214b, a third ring-shape sealing element 250 and a cover 270c are similar to that of the outer casing 110, the upper shell 112, the lower shell 114, the sidewall 114b, the first ring-shape sealing element 150 and the cover 170c of the projector 100, and details thereof are not repeated. A difference between the projector 200 and the projector 100 is that the sidewall 214b has a positioning hole H4, the cover 270c has a positioning column 272, and the positioning column 272 is inserted into the positioning hole H4 to position the cover 270c to the sidewall 214b. Moreover, the projector 200 includes a fourth ring-shape sealing element 280. The fourth ring-shape sealing element 280 is, for example, a rubber element and seals a gap between a periphery of the cover 270c and the casing 210, so as to prevent the external liquid (e.g. water) from entering inside of the projector through the gap between the cover 270c and the casing 210. In one embodiment, the fourth ring-shape sealing element 280 is the ring-shape rubber band.

Figure 9:
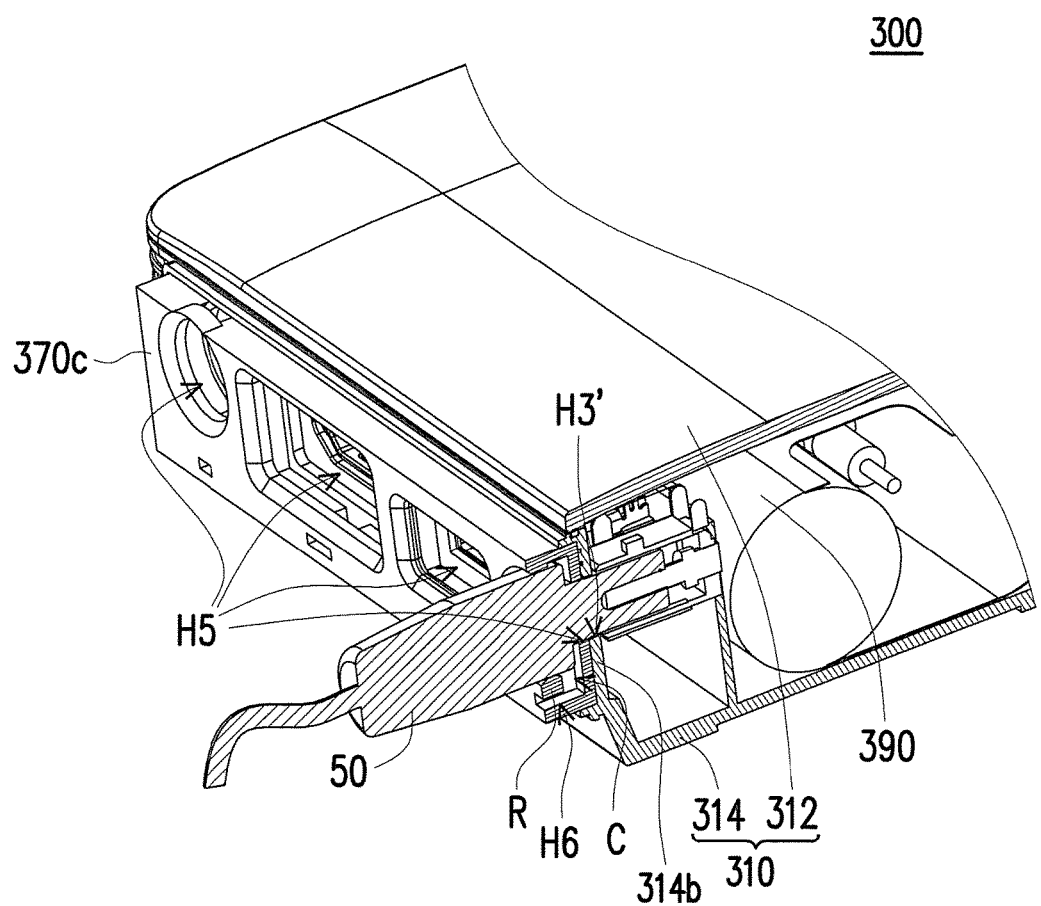
FIG. 9 is a partial structural three-dimensional view of a projector according to another embodiment of the invention.

FIG. 9 is a partial structural three-dimensional view of a projector according to another embodiment of the invention. In the projector 300 of FIG. 9, configuration and functions of a casing 310, an upper shell 312, a lower shell 314, a sidewall 314b, a signal input/output socket H3' and an electric power storage unit 390 are similar to that of the outer casing 110, the upper shell 112, the lower shell 114, the sidewall 114b, the signal input/output socket H3 and the electric power storage unit 190 of the projector 100 of FIG. 7, and details thereof are not repeated. A difference between the projector 300 and the projector 100 is that the cover 370c of the projector 300 has at least one opening H5 (a plurality of openings are illustrated) and at least one ring-shape sealing flange R (one ring-shape sealing flange is illustrated), where the opening H5 is aligned to the corresponding signal input/output socket H3'. When an external connector 50 sequentially penetrates through the opening H5 and the signal input/output socket H3' for connecting with the projector 300, the ring-shape sealing flange R surrounds the external connector 50 and seals a gap between the external connector 50 and the cover 370c, so as to prevent the external liquid (e.g. water) from entering inside of the projector 300 through the gap between the cover 370c and the external connector 50.

In the present embodiment, the cover 370c has a drain hole H6. When the external connector 50 sequentially penetrates through the opening H5 and the signal input/output liquid (e.g. water) H3' for connecting with the projector 300, a cavity C is formed between the external connector 50 and the cover 370c, and the drain hole H6 of the cover 370c is connected to the cavity C. In this way, when the external liquid (e.g. water) enters the cavity C between the external connector 50 and the cover 370c, the liquid could be drained through the drain hole H6, so as to reduce a chance that the liquid enters inside of the projector 300.

In summary, the embodiments of the invention have at least one of the following advantages. In the embodiments of the invention, the outer casing of the projector exposes the focusing portion of the projecting lens through the first opening, and the first opening is sealed by the flexible sealing element, so as to prevent external liquid from entering inside of the projector through the gap between the focusing portion and the periphery of the first opening. When the user operates the focusing portion, the flexible sealing element is deformed, such that the focusing portion is capable of being smoothly operated. In this way, based on configuration of the flexible sealing element, the projector has a good waterproof capability while the normal operation of the focusing portion is not influenced. Moreover, the ring-shape sealing element could be disposed between the upper shell and the lower shell of the outer casing, the transparent plate corresponding to the projection lens could be disposed on the outer casing in an adhesion manner, the waterproof film could be disposed at the sound holes of the outer casing, the cover could be installed to the signal input/output socket of the outer casing, the ring-shape sealing element could be disposed between the cover and the outer casing, the heat dissipation block could be disposed in the outer casing without configuring an air inlet and an air outlet at the outer casing for heat dissipation through air convection, the electric power storage unit could be configured in the outer casing without disassembling the cover for receiving external power through a socket, so as to further improve the waterproof capability of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   an outer casing, having a first opening;
   a projection lens, disposed in the outer casing and having a focusing portion, wherein the focusing portion is exposed to the first opening;
   a flexible sealing element, connected to a periphery of the first opening to seal the first opening, wherein the focusing portion is connected to the flexible sealing element, and when an external force is exerted to the flexible sealing element to drive the focusing portion to move the projection lens for focusing, so as to focus the projection lens, the flexible sealing element is deformed; and
   a cover, wherein the cover has at least one opening and at least one ring-shape sealing flange, a sidewall of the outer casing has at least one signal input/output socket, the cover is fixed to the sidewall, the opening is aligned to the signal input/output socket, and when an external connector sequentially penetrates through the opening and the signal input/output socket for connecting with the projector, the ring-shape sealing flange surrounds the external connector and seals a gap between the external connector and the cover.

2. The projector as claimed in claim 1, wherein the flexible sealing element comprises a sealing portion, a connection portion and a deformation portion, the sealing portion is connected to the periphery of the first opening, the connection portion is connected to the focusing portion, the deformation portion is connected between the sealing portion and the connection portion, and when the external force is exerted to the connection portion, the connection portion drives the focusing portion to move and the deformation portion is deformed.

3. The projector as claimed in claim 2, wherein the focusing portion is a pillar, and the connection portion wraps the pillar.

4. The projector as claimed in claim 2, wherein the projector comprises a fixing element, and the sealing portion is clamped between the periphery of the first opening and the fixing element.

5. The projector as claimed in claim 1, further comprising a first ring-shape sealing element, wherein the outer casing comprises an upper shell and a lower shell, and the ring-shape sealing element seals a gap between the upper shell and the lower shell.

6. The projector as claimed in claim 5, wherein the ring-shape sealing element seals a gap between a periphery of the upper shell and a periphery of the lower shell.

7. The projector as claimed in claim 5, further comprising a locking element, wherein the upper shell has a first projection, the lower shell has a second projection, the first projection has a first locking hole, the second projection has a second locking hole, the locking element locks the first projection to the second projection through the first locking hole and the second locking hole, and a second ring-shape sealing element surrounds the locking element and seals a gap between the first projection and the second projection.

8. The projector as claimed in claim 1, wherein the cover has a drain hole, when the external connector sequentially penetrates through the opening and the signal input/output socket for connecting with the projector, a cavity is formed between the external connector and the cover, and the drain hole is connected to the cavity.

9. The projector as claimed in claim 1, further comprising a transparent plate, wherein the outer casing has a second opening, the second opening is aligned to the projection lens, an optical axis of the projection lens passes through the second opening, and the transparent plate is adhered to a periphery of the second opening to seal the second opening.

10. The projector as claimed in claim 1, further comprising a waterproof film, wherein the outer casing has at least one sound hole, and the waterproof film covers the sound hole.

11. The projector as claimed in claim 1, further comprising a heat dissipation block, wherein the heat dissipation block is disposed in the outer casing, and is used for conducting heat within the outer casing to the outer casing.

12. The projector as claimed in claim 1, further comprising an electric energy storage unit, wherein the electric energy storage unit is disposed in the outer casing, and is used for providing electric power required for the operation of the projector.

* * * * *